No. 12,143. REISSUED AUG. 11, 1903.

B. B. BREWER & W. M. H. BURFEIND.

APPARATUS FOR SWAGING GOLD CROWNS.

APPLICATION FILED MAY 18, 1903.

WITNESSES:

K. Lockwood Nevins,

Frank Gorfinkel

INVENTORS

Benj. B. Brewer

W. M. H. Burfeind

BY

Francis M. Wright,

ATTORNEY.

THE NORRIS PETERS CO., WASHINGTON, D. C.

No. 12,143. Reissued August 11, 1903.

UNITED STATES PATENT OFFICE.

BENJAMIN B. BREWER AND WILLIAM M. H. BURFEIND, OF SAN FRANCISCO, CALIFORNIA.

APPARATUS FOR SWAGING GOLD CROWNS.

SPECIFICATION forming part of Reissued Letters Patent No. 12,143, dated August 11, 1903.

Original No. 674,232, dated May 14, 1901. Application for reissue filed May 18, 1903. Serial No. 157,625.

*To all whom it may concern:*

Be it known that we, BENJAMIN B. BREWER and WILLIAM M. H. BURFEIND, citizens of the United States, residing at San Francisco, in the county of San Francisco and State of California, have invented certain new and useful Improvements in Apparatus for Swaging Gold Crowns, of which the following is a specification.

Our invention relates to an improved swaging apparatus for making seamless contour gold crowns for teeth, and the object of our invention is to make a perfectly-fitting crown of any desired shape, contour, and occlusion without the use of solder.

Our invention therefore resides in the novel construction, combination, and arrangement of parts for the above ends hereinafter fully specified, and particularly pointed out in the claims.

Figure 1:
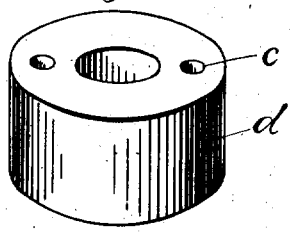
Figure 2:
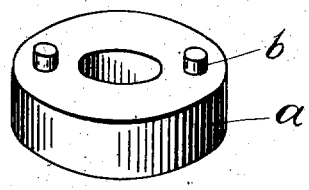
Figure 3:
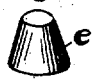
Figure 4:
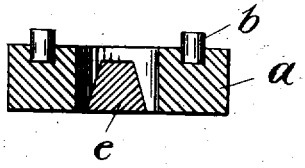
Figure 5:
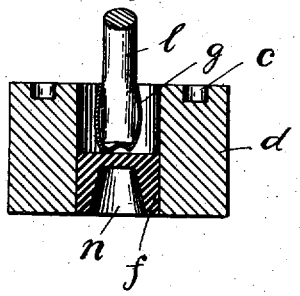
Figure 6:
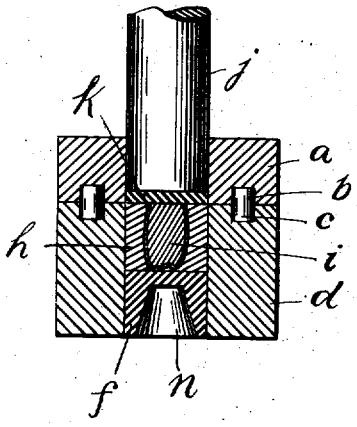

In the accompanying drawings, Figure 1 is a perspective view of the lower section of the casing. Fig. 2 is a similar view of the upper section. Fig. 3 is a similar view of a core used in forming a thimble. Fig. 4 is a sectional view of the core and one of the casing, sections used as a mold to form the thimble. Fig. 5 is a sectional view of the parts arranged in position to form a lead casting around the gold cup or crown, and Fig. 6 is a sectional view of the parts arranged for swaging the gold cup into the required shape.

The nature of our invention will be understood more readily by following in detail the manner in which we apply the same and by describing the different parts of the apparatus in the order in which they are used in the operation of swaging gold crowns by means thereof.

Referring therefore to Fig. 2, it will be seen that *a* represents the upper cylindrical section of a casing, having dowel-pins *b* to fit into recesses *c* in the lower cylindrical casing-section *d*. *e* is a core frusto-conical in form. Using the part *e* as a core in the center of the section *a* used as a mold, as shown in Fig. 4, a leaden thimble *f* is cast. This thimble *f* is now placed in the bottom of the section *d*, in which it fits snugly, since it was cast in the section *a*, which is the same diameter as *d*. The gold cup *g*, which is to be swaged, is now placed upon the top of the lead thimble *f* centrally of the section *d*, as shown in Fig. 5. Molten lead or other soft metal is now poured around the gold cup to the upper edge of said cup, as shown at *h*, care being taken to prevent the molten lead running over the upper edge of the cup, which may be done by inserting therein a stick of wood *l*, which about fills the cup. The stick is now withdrawn and there is inserted in the cup in its place the form *i*, previously prepared, to which the crown is to be swaged, and the form is now cut off even with the top of the cup. The section *a* is now fitted upon the top of the section *d* by means of the dowel-pins *b* and recesses *c* to serve as a guide for the punch *j*, through which power is to be applied for swaging the cup. A disk of lead *k*, fitting within the cylindrical section *a*, is placed upon the top of the cast lead *h* and the cup *g*, and the end of the punch *j* is inserted in said section *a* above the disk of the lead *k*.

The whole of the above apparatus, so arranged, is now placed upon a suitable anvil, and the punch is driven down by a heavy hammer until the lead has been compressed or swaged in the cylindrical casing to such an extent that the opening or recess *n* in the leaden thimble *f* has been completely closed. Then by driving the entire mass out of the casing the lead disk *k* and the thimble *f* will separate and fall off from the portion *h*, the gold crown remaining in the latter. By means of suitably-constructed cutting-nippers the portion *h* is split free from the gold crown, which will be found to be accurately outlined, and compressed or swaged to the interior form, as desired.

We claim—

1. In an apparatus for swaging dental crowns, the combination of a casing having a substantially cylindrical chamber, a form within the chamber to which the crown is to be swaged, a soft-metal jacket around the crown, and a hollow soft-metal support or thimble below the crown arranged to receive the impact of the hammer transmitted through the jacket and to have its cavity substantially closed thereby in the swaging of the crown by said impact, substantialy as described.

2. In an apparatus for swaging dental crowns, the combination of a casing, a yielding support for the crown within the casing, a form within the crown, to which it is to be swaged, and an internal jacket of soft metal cast around the crown, substantially as described.

3. In an apparatus for swaging dental crowns, the combination of a casing having a substantially cylindrical chamber, a form within the chamber to which the crown is to be swaged, a jacket of soft metal cast around the crown, and a hollow soft-metal support below the crown, substantially as described.

4. In an apparatus for swaging dental crowns, the combination of a casing having a cylindrical chamber open at both ends, a cylindrical plunger fitting snugly in said chamber, a soft-metal support in said chamber near one end for the crown, a form in the chamber to which the crown is to be swaged and a soft-metal jacket in the chamber around the crown, substantially as described.

5. In an apparatus for swaging dental crowns, the combination of a casing having a chamber open at both ends and of uniform cross-section throughout, a form within the chamber to which the crown is to be swaged, and a jacket of compressible material in the chamber around the crown, substantially as described.

6. In an apparatus for swaging dental crowns, the combination of a casing having a chamber open at both ends and of uniform cross-section throughout, a form within the chamber to which the crown is to be swaged, and deformable material in the chamber around the crown, substantially as described.

In witness whereof we have hereunto set our hands in the presence of two subscribing witnesses.

BENJAMIN B. BREWER.
WILLIAM M. H. BURFEIND.

Witnesses:
FRANCIS M. WRIGHT,
BESSIE GORFINKEL.